United States Patent
Tissot-Dupont et al.

(10) Patent No.: US 11,418,559 B2
(45) Date of Patent: Aug. 16, 2022

(54) CONTENT DISTRIBUTION SYSTEM

(71) Applicant: Logitech Europe S.A., Lausanne (CH)

(72) Inventors: Eric Andre Tissot-Dupont, San Francisco, CA (US); Vasanth Prabhakar Murari, Newark, CA (US); Edison Liwanag David, Mountain View, CA (US)

(73) Assignee: LOGITECH EUROPE S.A., Lausanne (CH)

( * ) Notice: Subject to any disclaimer, the term of this patent is extended or adjusted under 35 U.S.C. 154(b) by 7 days.

(21) Appl. No.: 17/027,641

(22) Filed: Sep. 21, 2020

(65) Prior Publication Data
US 2022/0094726 A1 Mar. 24, 2022

(51) Int. Cl.
| | |
|---|---|
| *H04L 65/611* | (2022.01) |
| *H04W 88/08* | (2009.01) |
| *H04W 88/06* | (2009.01) |
| *H04L 65/612* | (2022.01) |
| *H04W 84/12* | (2009.01) |
| *H04L 65/80* | (2022.01) |
| *H04W 76/10* | (2018.01) |

(52) U.S. Cl.
CPC ...... *H04L 65/4076* (2013.01); *H04L 65/4084* (2013.01); *H04L 65/80* (2013.01); *H04W 76/10* (2018.02); *H04W 84/12* (2013.01); *H04W 88/06* (2013.01); *H04W 88/08* (2013.01)

(58) Field of Classification Search
CPC . H04W 65/4076; H04W 76/10; H04W 84/12; H04L 65/4084; H04L 65/80
See application file for complete search history.

(56) References Cited

U.S. PATENT DOCUMENTS

| | | | |
|---|---|---|---|
| 5,434,617 | A | 7/1995 | Bianchi |
| 5,946,343 | A | 8/1999 | Schotz et al. |
| 6,240,303 | B1 | 5/2001 | Katzur |
| 6,392,694 | B1 | 5/2002 | Bianchi |

(Continued)

OTHER PUBLICATIONS

Eileen Burbidge et al. "Google Introduces New Open Format and Developer Tools for Working with BLE Beacons", Disrupt London. https://techcrunch.com/2015/07/14/google-introduces-open-format-and-developer-tools-for-bluetooth-le-beacons/.

(Continued)

*Primary Examiner* — Mohammad S Anwar
(74) *Attorney, Agent, or Firm* — Patterson & Sheridan, LLP

(57) ABSTRACT

A wireless communication system is provided including a group of media devices that includes a first media device, a second media device, a third media device, and a fourth media device. The first media device, during a first time period, is designated as an access point media device that is configured to transmit media content to each of the other media devices in the group. The second media device is configured to become the access point media device during a second time period and transmit media content to each of the other media devices in the group based on a determination that the second media device is better suited than the first media device to be the access point media device for the group during the second time period. Each media device is configured to output the media content transmitted by the access point media device in a synchronized manner.

16 Claims, 8 Drawing Sheets

(56) References Cited

U.S. PATENT DOCUMENTS

| | | |
|---|---|---|
| 6,519,648 B1 | 2/2003 | Eyal |
| 6,587,684 B1 | 7/2003 | Hsu et al. |
| 6,608,907 B1 | 8/2003 | Lee |
| 6,611,281 B2 | 8/2003 | Strubbe |
| 6,731,334 B1 | 5/2004 | Maeng et al. |
| 6,829,391 B2 | 12/2004 | Comaniciu et al. |
| 7,133,513 B1 | 11/2006 | Zhang |
| 7,295,809 B2 | 11/2007 | Moore |
| 7,298,733 B2 | 11/2007 | Sakai et al. |
| 7,349,008 B2 | 3/2008 | Rui et al. |
| 7,433,327 B2 | 10/2008 | Harville et al. |
| 7,483,538 B2 | 1/2009 | McCarty et al. |
| 7,876,923 B2 | 1/2011 | Finnegan et al. |
| 8,005,473 B2 | 8/2011 | Zeinstra et al. |
| 8,094,193 B2 | 1/2012 | Peterson et al. |
| 8,284,254 B2 | 10/2012 | Romanowich et al. |
| 8,358,328 B2 | 1/2013 | Friel et al. |
| 8,396,007 B2 | 3/2013 | Gonia et al. |
| 8,471,889 B1 | 6/2013 | Lee et al. |
| 8,547,414 B2 | 10/2013 | Sheeley |
| 8,780,168 B2 | 7/2014 | Corley et al. |
| 8,842,161 B2 | 9/2014 | Feng et al. |
| 8,872,882 B2 | 10/2014 | Shanmukhadas et al. |
| 8,885,057 B2 | 11/2014 | Mock |
| 8,913,103 B1 | 12/2014 | Sargin et al. |
| 9,001,183 B2 | 4/2015 | Mauchly |
| 9,125,138 B2 | 9/2015 | Abuan et al. |
| 9,125,146 B1 | 9/2015 | Edara et al. |
| 9,237,307 B1 | 1/2016 | Vendrow |
| 9,270,941 B1 | 2/2016 | Lavelle |
| 9,549,153 B1 | 1/2017 | Delorenzi et al. |
| 9,554,405 B2 | 1/2017 | Weel |
| 9,763,029 B2 | 9/2017 | Mirza et al. |
| 9,785,772 B1 | 10/2017 | Johansson et al. |
| 9,801,234 B2 | 10/2017 | Caine et al. |
| 9,942,661 B2 | 4/2018 | Dusse et al. |
| 10,115,396 B2 | 10/2018 | Anderson et al. |
| 10,268,759 B1 | 4/2019 | Witt et al. |
| 10,270,826 B2 | 4/2019 | Panguluri |
| 10,299,042 B2 | 5/2019 | Dusse et al. |
| 10,341,792 B1 | 7/2019 | Zhang et al. |
| 10,606,551 B2 | 3/2020 | Thurman et al. |
| 10,642,573 B2 | 5/2020 | Thurman et al. |
| 10,789,038 B2 | 9/2020 | Thurman et al. |
| 11,038,937 B1 | 6/2021 | D'Amato |
| 2004/0003409 A1 | 1/2004 | Berstis |
| 2005/0289224 A1 | 12/2005 | Deslippe et al. |
| 2006/0009985 A1 | 1/2006 | Ko et al. |
| 2006/0069797 A1 | 3/2006 | Abdo et al. |
| 2006/0095339 A1 | 5/2006 | Hayashi et al. |
| 2006/0153110 A1 | 7/2006 | Morgan et al. |
| 2007/0048712 A1 | 3/2007 | Plastina et al. |
| 2007/0088727 A1 | 4/2007 | Kindig |
| 2007/0223725 A1 | 9/2007 | Neumann et al. |
| 2008/0089268 A1 | 4/2008 | Kinder et al. |
| 2008/0192666 A1 | 8/2008 | Koskan et al. |
| 2008/0247554 A1 | 10/2008 | Caffrey |
| 2009/0125609 A1 | 5/2009 | Wood |
| 2009/0154365 A1 | 6/2009 | Diab et al. |
| 2009/0298420 A1 | 12/2009 | Haartsen et al. |
| 2010/0178870 A1 | 7/2010 | Choi |
| 2010/0284389 A1 | 11/2010 | Ramsay et al. |
| 2010/0308765 A1 | 12/2010 | Moore et al. |
| 2011/0055256 A1 | 3/2011 | Phillips et al. |
| 2011/0128350 A1 | 6/2011 | Oliver et al. |
| 2011/0129048 A1 | 6/2011 | Barbe et al. |
| 2011/0136442 A1 | 6/2011 | Beals |
| 2011/0158441 A1 | 6/2011 | Batra |
| 2011/0197214 A1 | 8/2011 | Burton et al. |
| 2011/0223893 A1 | 9/2011 | Lau et al. |
| 2012/0036584 A1* | 2/2012 | Risan .................. G06F 21/10 726/28 |
| 2013/0007499 A1 | 1/2013 | Moy |
| 2013/0174223 A1 | 7/2013 | Dykeman et al. |
| 2013/0183958 A1 | 7/2013 | Wesby |
| 2013/0335508 A1 | 12/2013 | Mauchly |
| 2013/0339509 A1* | 12/2013 | Johnson .................. H04L 41/14 709/223 |
| 2014/0003625 A1 | 1/2014 | Sheen et al. |
| 2014/0012990 A1 | 1/2014 | Ko |
| 2014/0111600 A1 | 4/2014 | Schaefer et al. |
| 2014/0115115 A1 | 4/2014 | Kuang |
| 2014/0213227 A1 | 7/2014 | Rao |
| 2014/0274203 A1 | 9/2014 | Ganong et al. |
| 2014/0277642 A1 | 9/2014 | Anderson et al. |
| 2014/0277646 A1 | 9/2014 | Anderson et al. |
| 2014/0313282 A1 | 10/2014 | Ma et al. |
| 2015/0022636 A1 | 1/2015 | Savransky |
| 2015/0092947 A1* | 4/2015 | Gossain ............... H04B 17/318 381/58 |
| 2015/0156257 A1 | 6/2015 | Li et al. |
| 2015/0208352 A1 | 7/2015 | Backholm et al. |
| 2015/0254435 A1 | 9/2015 | Fells |
| 2015/0256577 A1 | 9/2015 | Gutierrez Vilaro et al. |
| 2015/0289295 A1 | 10/2015 | Granbery |
| 2015/0326638 A1 | 11/2015 | Yarygin |
| 2015/0379021 A1 | 12/2015 | Kuper |
| 2016/0132563 A1 | 5/2016 | Bhandari et al. |
| 2016/0156992 A1 | 6/2016 | Kuper |
| 2016/0198410 A1 | 7/2016 | Cherniavsky et al. |
| 2016/0205716 A1 | 7/2016 | Wu et al. |
| 2016/0291861 A1 | 10/2016 | Song et al. |
| 2017/0041376 A1 | 2/2017 | Lin et al. |
| 2017/0064599 A1 | 3/2017 | Caine et al. |
| 2017/0244643 A1 | 8/2017 | Lawrence et al. |
| 2017/0353907 A1 | 12/2017 | Beattie, Jr. |
| 2018/0077592 A1 | 3/2018 | Kim et al. |
| 2018/0167832 A1 | 6/2018 | Fang et al. |
| 2018/0190279 A1 | 7/2018 | Anderson et al. |
| 2018/0288123 A1 | 10/2018 | Panguluri |
| 2019/0028758 A1 | 1/2019 | Talvensaari et al. |
| 2019/0273991 A1 | 9/2019 | Dusse et al. |
| 2020/0205125 A1 | 6/2020 | Liu et al. |
| 2022/0014344 A1 | 1/2022 | Zhang et al. |

OTHER PUBLICATIONS

Patently Apple. Apr. 13, 2014.http://www.patentlyapple.com/patently-apple/2014/04/when-it-comes-to-ibeacon-readiness-ios-7-idevices-score-87-vs-android-devices-at-a-paltry-25.html.

Wojciech Borowicz et al. "Building Apps in the Age of Beacons and Internet of Things", Mar. 11, 2015. https://uxmag.com/articles/building-apps-in-the-age-of-beacons-and-internet-of-things.

Sarah Perez. Robin, A Company Enabling Sensor-Powered Smart Offices, Raises $1.4 Million. Jul. 7, 2014. https://techcrunch.com/2014/07/07/robin-a-company-enabling-sensor-powered-smart-offices-raises-1-35-million/.

Ron Amadeo, "Meet Google's "Eddystone"—A Flexible, Open Source iBeacon Fighter". Jul. 14, 2015. http://arstechnica.com/gadgets/2015/07/meet-googles-eddystone-a-flexible-open-source-ibeacon-fighter/.

Home—bttn. (n.d.). Retrieved Sep. 1, 2015. <https://bt.tn/>.

Amazon.com: Dash Button. (n.d.). Retrieved Sep. 1, 2015. <http://www.amazon.com/b/?node=10667898011&Io=digital-text>.

Hue—Personal Wireless Lighting. (n.d.). Retrieved Sep. 1, 2015. <http://www2.meethue.com/en-us/the-range/hue-tap/>.

Philips solves Hue's biggest problem with new dimmer switch. (Aug. 25, 2015). Retrieved Sep. 1, 2015. <http://www.theverge.com/2015/8/25/9204523/philips-solves-hue-s-biggest-problem-with-new-dimmer-switch>.

Office Action dated Dec. 2, 2015 for U.S. Appl. No. 14/835,352.

U.S. Appl. No. 17/027,638, filed Sep. 21, 2020.

Non-Final Office Action dated Feb. 24, 2022 for U.S. Appl. No. 17/027,638.

* cited by examiner

CONTENT DISTRIBUTION SYSTEM

BACKGROUND

Field

Embodiments of the present disclosure generally relate to an improved content distribution system for outputting media content from a plurality of wireless media devices in a synchronized manner.

Description of the Related Art

The popularity of portable music players has increased dramatically in the past decade. Modern portable music players allow music enthusiasts to listen to music in a wide variety of different environments. To improve a user's experience it is often desirable to link two or more portable speakers and an audio source, such as a music player, together to provide a richer and enveloping audio experience. Due to limitations in standard wireless communication protocols it is a non-trivial task to setup and control the playback of audio or mixed media content delivered from a source (e.g., music player).

Playing media content (e.g., audio and/or visual content) across multiple wireless media devices (e.g., wireless speakers, tablets, gaming devices, etc.) in a synchronized format is important to create an enhanced user experience. For example, playing audio content across multiple wireless speakers can create a more enjoyable experience for the user(s) listening to the audio content. Maintaining the synchronized output of the media content can be challenging though and can often be interrupted, for example, when other electronic devices compete for available network bandwidth, other media devices join the group that is playing the synchronized media content, or media devices move further away from each other.

Therefore, there is a need for an improved audio and/or visual content distribution system and related methods that can overcome the challenges described above.

SUMMARY

Embodiments of the present disclosure generally relate to an improved content distribution system for outputting audio and/or visual media content from a plurality of wireless media devices (e.g., wireless speakers, tablets, gaming devices, etc.) in a synchronized manner.

In one embodiment, a wireless communication system is provided including a group of media devices comprising a first media device, a second media device, a third media device, and a fourth media device. The first media device, during a first time period, is designated as an access point media device that is configured to transmit media content to each of the other media devices in the group. The second media device is configured to become the access point media device during a second time period and transmit media content to each of the other media devices in the group based on a determination that the second media device is better suited than the first media device to be the access point media device for the group during the second time period. Each media device in the group is configured to output the media content transmitted by the access point media device in a synchronized manner during the first time period and the second time period. In some embodiments, the second media device is configured to become the access point media device for the group during the second time period when a confirmation is received at the second media device indicating that the timing is appropriate to switch the access point media device based on content found within the media content. The content within the media content can thus determine a timing of the transition from the first period of time to the second period of time.

In another embodiment, a wireless communication system is provided including a group of media devices comprising a first media device, a second media device, a third media device, and a fourth media device, each media device configured to output media content. The first media device is designated as a source media device. The second media device, during a first time period, is designated as an access point media device that is configured to transmit media content received from the source media device to each of the media devices in the group other than the source media device. The third media device is configured to be the access point media device during a second time period and transmit media content received from the source media device to each of the media devices in the group other than the source media device based on (1) a determination that the third media device is better suited than the second media device to be the access point media device for the group during the second time period and (2) receiving confirmation from the source media device that the timing is appropriate to switch the access point based on identification of a period of silence in the media content or a period of less important content in the media content by the source media device. The media devices in the group are each configured to output the media content received and transmitted by the access point media device in a synchronized manner during the first time period and the second time period.

In another embodiment, a method of distributing media content throughout a group of media devices is provided. The group includes a first media device, a second media device, a third media device, and a fourth media device, each media device configured to output media content, the method comprising: designating the first media device, during a first time period, as an access point media device for the group; transmitting, by the first media device, media content to the other media devices in the group during the first time period; switching the media device acting as the access point media device for the group from the first media device to the second media device based on a determination that the second media device is better suited than the first media device to be the access point media device for the group during the second time period; and transmitting, by the first media device, media content to the other media devices in the group during the first time period.

In another embodiment, a wireless communication system, comprising a plurality of media devices comprising a first media device, a second media device, and a third media device, each media device configured to output media content, wherein the first media device is designated as an access point media device that is configured to transmit media content to the second media device and the third media device, the first media device is configured to transmit the media content to the second media device using simplex communication instead of duplex communication based on a first confidence level indicator derived from information received from the second media device indicating a first level of confidence, and the first media device is configured to transmit the media content to the third media device using duplex communication instead of simplex communication based on a second confidence level indicator derived from information received from the third media device indicating a second level of confidence. The first level of confidence being within a high confidence range and the second level of confidence being within a low confidence range. The second confidence level being less than the first level of confidence.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to an improved content distribution system for outputting media content from a plurality of wireless media devices (e.g., wireless speakers, tablets, gaming devices, video conferencing equipment, etc.) in a synchronized manner. Some of the improvements offered by the disclosed content distribution system generally relate to at least one of the following: (1) communicating the media content on an independent wireless network (i.e., a closed private network) only used by the media devices; (2) communicating the media content to the media devices using a mix of simplex and duplex communication; (3) allowing for architecture of the wireless network used by the wireless media devices to be seamlessly switched during output of the media content; and (4) distributing tasks relating to network control and timing among the different media devices.

Figure 1A:
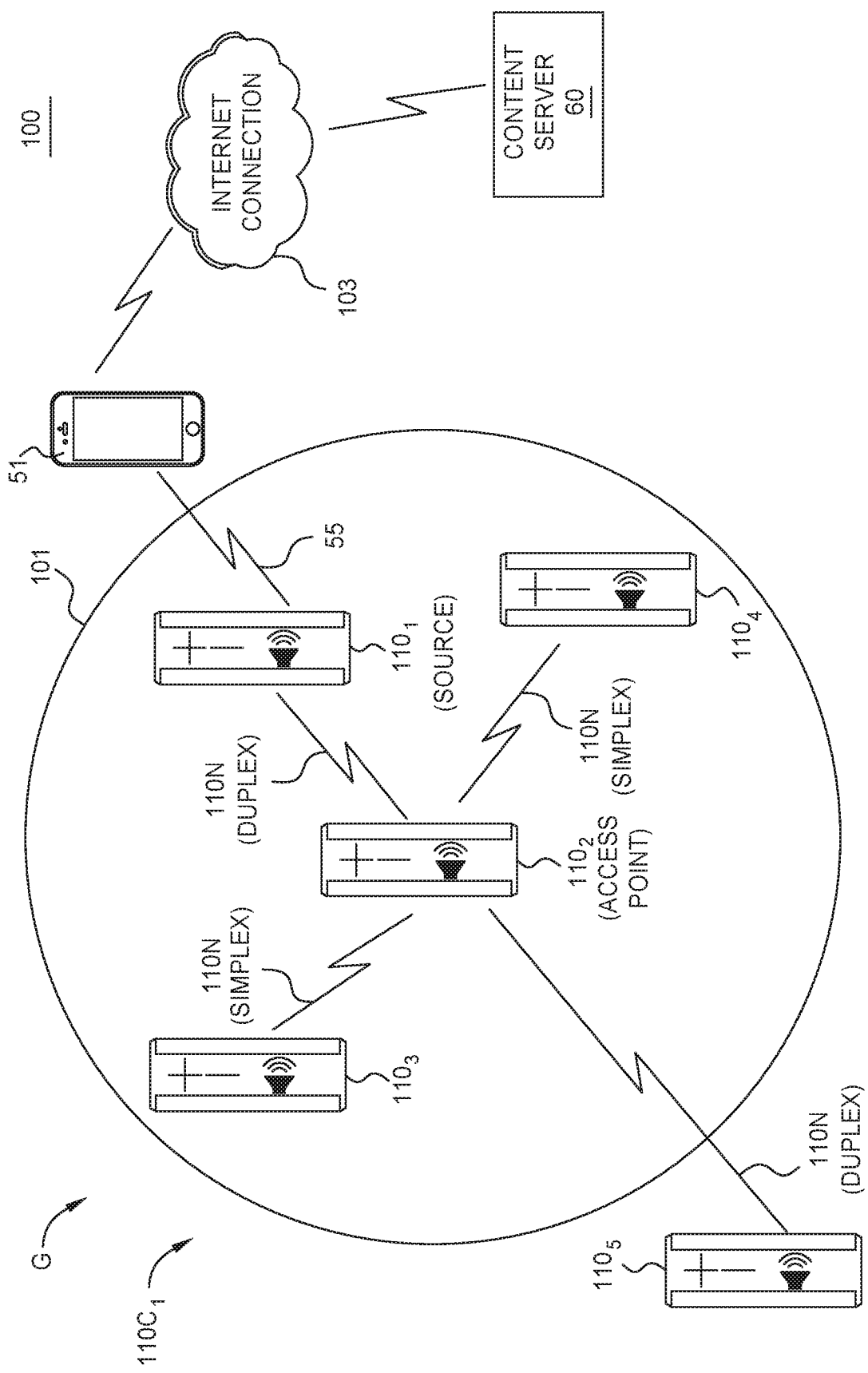
FIG. 1A is a block diagram of a content distribution system, according to one embodiment.

FIG. 1A is a block diagram of a content distribution system 100, according to one embodiment. The content distribution system 100 includes a group G of media devices 110, a first content source device 51, and a content server 60. The group G of media devices 110 is shown in a first configuration $110C_1$ that differs from other configurations described below, such as the second configuration $110C_2$ shown in FIG. 2A. The media devices 110 can be used to provide media content (e.g., audio and/or visual content) to one or more users. The media devices 110 are shown as wireless speakers, but can be any type of device capable of receiving and/or transmitting media content wirelessly and providing media content to a user as described in more detail below. Furthermore, the first content source device 51 is shown as a smart phone, but the first content source device 51 can be any type of device capable of transmitting media content wirelessly to another device as described in more detail below. The content server 60 can be an Internet accessible server of a content provider (e.g., Pandora®, Spotify®, Netflix®, Apple Music®, SoundCloud®, Prime Music®, and Deezer®).

The first content source device 51 can be connected to the content server 60 through an internet connection 103, so that media content from the content server 60 can be provided to the group G of media devices 110 through the first content source device 51. As shown in FIG. 1A, the first content source device 51 can transmit the media content received from the content server 60 to a first media device $110_1$ of the group G over a first communication link 55. The first communication link 55 can be a wireless communication link, for example a Bluetooth® or Wi-Fi communication link.

The first media device $110_1$ can then transmit the received media content to a second media device $110_2$ of the group G. After receiving the media content from the first media device $110_1$, the second media device $110_2$ can then transmit the media content to the third, fourth, and fifth media devices $110_{3-5}$ in the group G, and then the group G of media devices 110 can output the media content in a synchronized manner. The media devices 110 can communicate with each other using a wireless network 110N.

The wireless network 110N is independent from other nearby wireless networks and communication links. For example, in one embodiment, the media devices 110 in the group G can communicate with each other using a Wi-Fi network that is separate from any nearby Wi-Fi network, so that any communication on other Wi-Fi networks does not interfere with the communication between the media devices 110 of the group G using the wireless network 110N. Furthermore, the wireless network 110N is independent from the first communication link 55 used to transmit media content from the first content source device 51 to the first media device $110_1$. For example, in one embodiment, the first communication link 55 is a Bluetooth® communication link while the wireless network 110N is a Wi-Fi network. In some embodiments, the media devices 110 can be capable of communicating with each other at different wireless frequencies, and the frequency selected for communication by the media devices 110 can be adjusted to avoid communicating at a same or similar frequency as other nearby wireless devices.

Because the first media device $110_1$ is the first device in the group G to receive and transmit the media content, the first media device $110_1$ is also referred to as the source media device $110_1$ and is labeled as "source" in FIG. 1A. Similarly, because the second media device $110_2$ distributes the media content to the remaining media devices 110 in the group G, the second media device $110_2$ is referred to as the access point media device $110_2$ and is labeled as "access point" in FIG. 1A.

The media devices 110 can distribute the media content among the group G using a mix of duplex communication (e.g., bidirectional communication) and simplex communication (e.g., unidirectional communication). In some embodiments, when confirmation of the communication of the media content is desired, duplex communication between the media devices 110 can be used. For example, confirmation of successful communication between the source media device $110_1$ and access point media device $110_2$ of the group G may be desired since the communication to the rest of the group G of media devices 110 depends on this communication. Therefore, the communication of the media content between the source media device $110_1$ and the access point media device $110_2$ can use duplex communication. The confirmation from the receiving media device 110 transmitted back to the access point media device $110_2$ can include a simple acknowledgement (e.g., a byte of data) or a more detailed acknowledgement, for example an acknowledge including results from an error checking algorithm. When the terms simplex communication and duplex communication are used herein, this refers only to communication of the media content since each media device 110 will regularly transmit data and receive data to and from one or more other media devices 110 in the group G despite possibly only receiving the media content using simplex communication. Another difference between simplex and duplex communication for transmitting the media content from the access point media device $110_2$ to the other media devices 110 is that the duplex communication can include addressing (e.g., MAC address) for the particular media device 110 that is to receive media content over duplex communication while simplex communication of media content would not include such addressing.

In some embodiments, it may also be desirable for lower-confidence communications (e.g., communications over longer distances or communications with weaker signals) to use duplex communication for the media content to enable re-sending of media content from the access point media device $110_2$ if a first transmission from the access point media device $110_2$ is not received by the corresponding destination media device 110. For example, the fifth media device $110_5$ is shown being located outside a high-confidence zone 101 for communication with the access point media device $110_2$, so communication between the access point media device $110_2$ and the fifth media device $110_5$ can be performed using duplex communication.

On the other hand, the third media device $110_3$ and the fourth media device $110_4$ are shown being located within the high-confidence zone 101 for communication with the access point media device $110_2$, so the communication of the media content from the access point media device $110_2$ to the third media device $110_3$ and to the fourth media device $110_4$ can be done using simplex communication with no confirmation of receipt of the media content by the third and fourth media devices $110_{3,4}$ needed. Using simplex communication for these high-confidence communications can free up resources of the access point media device $110_2$, which can provide a number of benefits. For example, freeing up resources of the access point (e.g., processing power) can (1) enable the group G to achieve lower overall latency when output of media content is initiated or changed, (2) allow for more media devices 110 to be connected to the access point media device $110_2$, and/or (3) allow for the transmission of higher quality media content to each of the media devices 110, such as media content with a higher resolution.

The access point media device $110_2$ can periodically (e.g., once every five seconds, five minutes, etc.) check responses from the other media devices 110 to determine if the communication of the media content to a particular media device 110 should be changed from simplex to duplex or vice versa.

In one embodiment, the access point media device $110_2$ can determine whether to communicate the media content to a particular media device 110 using simplex or duplex communication based on a received signal strength indicator (RSSI) derived from a signal received from a particular media device 110. For example, if the RSSI for the signal received from the particular media device 110 is above a threshold (i.e., indicating a high signal strength), then simplex communication can be used for transmitting the media content from the access point media device $110_2$ to the particular media device 110. On the other hand, if the RSSI for the signal received from the particular media device 110 is below a threshold (i.e., indicating a low signal strength), then duplex communication can be used for transmitting the media content from the access point media device $110_2$ to the particular media device 110.

In another embodiment, the access point media device $110_2$ can determine whether to communicate the media content to a particular media device 110 using simplex or duplex communication based on how fast a response from a particular media device 110 is received (also referred to as response time) after a request for the response is sent from the access point media device $110_2$ to the particular media device 110. For example, if the response to the request is received from the particular media device 110 in a time (response time) less than a threshold time, then simplex communication can be used for transmitting the media content from the access point media device $110_2$ to the particular media device 110. On the other hand, if the response is received from the particular media device 110 in a time (response time) greater than a threshold time, then duplex communication can be used for transmitting the media content from the access point media device $110_2$ to the particular media device 110. In one embodiment, the access point media device $110_2$ can use timestamps from its clock to determine response times from the different devices. For example, a difference between a first timestamp for when the access point media device $110_2$ transmits a message to another media device 110 and a second timestamp for when the access point media device $110_2$ receives a response from that other media device 110 can be equal to the response time for that other media device. Also, in some configurations, the clocks in the various devices can be synched by use of one or more time stamps provided by the access point media device, such that each device can be directed to perform some activity, such as generate an audible sound, at some time in the future that is set by the access point (e.g., global reference clock).

In another embodiment, the access point media device $110_2$ can check error rates from the different media devices 110 to determine whether to use simplex or duplex communication for communication of the media content with the other medias device 110. For example, if the error rate from a particular media device 110 exceeds a threshold, then duplex communication can be used between the access point media device $110_2$ and the particular media device 110 for transmitting the media content from the access point media device $110_2$ to the particular media device 110. On the other hand, if the error rate from a particular media device 110 is less than a threshold, then simplex communication can be used between the access point media device $110_2$ and the particular media device 110 for transmitting the media content from the access point media device $110_2$ to the particular media device 110. The error rate can be determined based on time or based on a number of messages sent to the particular media device 110. In some of these embodiments, the error rate can be checked by having the particular media device 110 determine whether there was an error and/or the relative error amount in the transmitted media content by (1) detecting one or more missing packets, for example by using sequence numbers associated with the packets, or (2) detecting corrupted packets by using one or more consistency checks for received packets. The particular media device 110 can then transmit the resulting error status to the access point media device 110₂. In some embodiments, the transmission of this error status can be at a lower transmission rate than the transmission rate used for the media content.

In other embodiments, the particular media device 110 perform an algorithm (e.g., a checksum) on a data packet received from the access point media device 110₂. In some of these embodiments, the particular media device 110 can use the results from the algorithm to determine if an error occurred with an error message being sent to the access point media device 110₂ indicating whether or not an error occurred. In other embodiments, the results of the algorithm (e.g., results of a checksum) can be sent to the access point media device 110₂, so that the access point media device 110₂ can determine if an error occurred. Some metrics and features that can be used in determining whether or not a significant error occurred include RSSI levels, error rate, number of retries for a successful transmission of one or more packets, and a modulation and coding scheme (MCS) index.

The RSSI levels, response times and error rates from the media devices 110 can be collectively referred to as confidence level indicators that either indicate high or low levels of confidence. High RSSI levels, fast response times, and low error rates are confidence level indicators that indicate a high level of confidence while low RSSI levels, slow response times, and high error rates are confidence level indicators that indicate a low level of confidence. Having the access point media device 110₂ monitor one or more of these confidence level indicators for each media device 110 can be useful when conditions change around the media devices 110. For example, moving a particular media device 110 can cause the confidence level indicator for communication to that media device 110 to change. Similarly, moving the access point media device 110₂ can cause the confidence level indicator for communication to one or more of the other media devices 110 to change. Confidence level indicators for communication can also change when the media devices 110 remain stationary, for example, when an object is moved (e.g., a door opening or closing) between the access point media device 110₂ and one of the other media devices 110, or when another interfering factor changes, such as the addition or removal of other wireless devices communicating at a same or similar frequency as the media devices 110.

In some embodiments, processing demands placed on the access point media device 110₂ can be further reduced by having the source media device 110₁ determine the timing data for each media device 110 that enables the media devices 110 to collectively output the media content for user(s) in a synchronized manner. The process of outputting the media content for a user in a synchronized manner can include generating an audible signal, such as generating sound by use of an audio speaker, and/or displaying a portion of the media content on a display of an electronic device in a synchronized manner. In some of these embodiments, the access point media device 110₂ can send data to the source media device 110₁ relating to the architecture of the wireless network 110N that identifies how many media devices 110 are between the source media device 110₁ and a given media device 110. Although FIG. 1A shows each media device 110 directly connected to the access point media device 110₂, in some embodiments one or more media devices 110 may be connected to the access point media device 110₂ through one or more other media devices 110. Thus, the highest number of devices between the source media device 110₁ and another media device in the group G can be used to determine the timing data that each media device 110 uses to output the media content that is synchronized with the other media devices 110 as described in the examples below.

After receiving the architecture information, the source media device 110₁ can determine timing data for itself as well as transmit timing data (e.g., determined from the highest number of media devices between the source media device 110₁ and another media device 110) to each other media device 110 indicating when each media device 110 should output a particular portion of media content, so that the synchronized output of the media content by the media devices 110 of the group G can be achieved. For example, in one embodiment, the source media device 110₁ may determine to (1) delay itself by 1 second, (2) have the access point media device 110₂ delay by 0.5 seconds, and (3) have the other media devices 110₃₋₅ operate without any delay for playing a particular portion of media content in a synchronized manner. Because each media device 110 is directly connected to the access point media device 110₂ in this example, the highest number of media devices 110 between the source media device 110₁ and another media device 110 is one. Another embodiment could include a sixth media device (not shown) connected to the access point media device 110₂ through the third media device 110₃, and in this embodiment the source media device 110₁ could then determine to (1) delay itself by 1.5 seconds, (2) have the access point media device 110₂ delay by 1 second, (3) have the media devices 110₃₋₅ delay by 0.5 seconds, and (4) have the sixth media device 110₆ operate without any delay for playing a particular portion of media content in a synchronized manner. Because the sixth media device 110₆ is connected to the access point media device 110₂ through the third media device 110₃ in this example, the highest number of media devices 110 between the source media device 110₁ and another media device 110 is two, and the delays used in this example are longer than the delays used in the example above in which the highest number of media devices 110 between the source media device 110₁ and another media device 110 was one.

Furthermore, the source media device 110₁ can send the timing data in a data packet that is separate from the one or more data packets of media content relating to that timing data. Sending the timing data in a data packet separate from the media content can allow for reducing the amount of data transmitted, so that more bandwidth is available for transmission of the media content. For example, timing data in a separate packet can be encoded to use as little as one byte of data while including the timing data in the media packet(s) often requires four or more bytes of data. In one embodiment, the timing data in a separate packet can use a sequence number (e.g., an integer) associated with the separate media content packet. This sequence number can roll over (i.e., go back to zero or near zero) frequently and start over, which helps reduce the size of the of this separate timing packet relative to timing included in the media content packet, which would be required to be a timestamp with microsecond precision requiring four or more bytes.

The media devices 110 are shown as wireless speakers, but the media devices 110 can be any type of electronic device capable of communicating through a wired or wireless connection with other electronic devices and capable of outputting media content (e.g., audio and/or visual content) to one or more users. Furthermore, there is no need for the media devices 110 to be a same type of media device as shown. For example, the first media device $110_1$ could be a wireless speaker and the second media device $110_2$ could be a tablet (e.g., an iPad®). The visual content output by the media devices 110 in some embodiments can include video content or gaming content as well as any other form of content that can be consumed visually, such as a series of still images. The first content source device 51 is shown as a smart phone, but the first content source device 51 can be any type of electronic device capable of transmitting media content wirelessly to at least one of the media devices 110. For example, the first content source device 51 can be a smartphone, smart watch, laptop, tablet, e-book reader, desktop computer, portable music player, or other useful electronic device. Furthermore, in some embodiments, the media content to be output in a synchronized manner by the media devices 110 can be stored on one of the media devices 110 making the first content source device 51 as well as the content server 60 unnecessary. For example, some embodiments in which the first content source device 51 and content server 60 can be omitted can include situations in which Internet is unavailable or undesired, such as giving a walking tour in a museum or in a remote location. Alternatively in some embodiments, one of the media devices 110 can communicate with one or more content providers on the Internet, such as with the content server 60, which can make the first content source device 51 unnecessary.

Figure 1B:
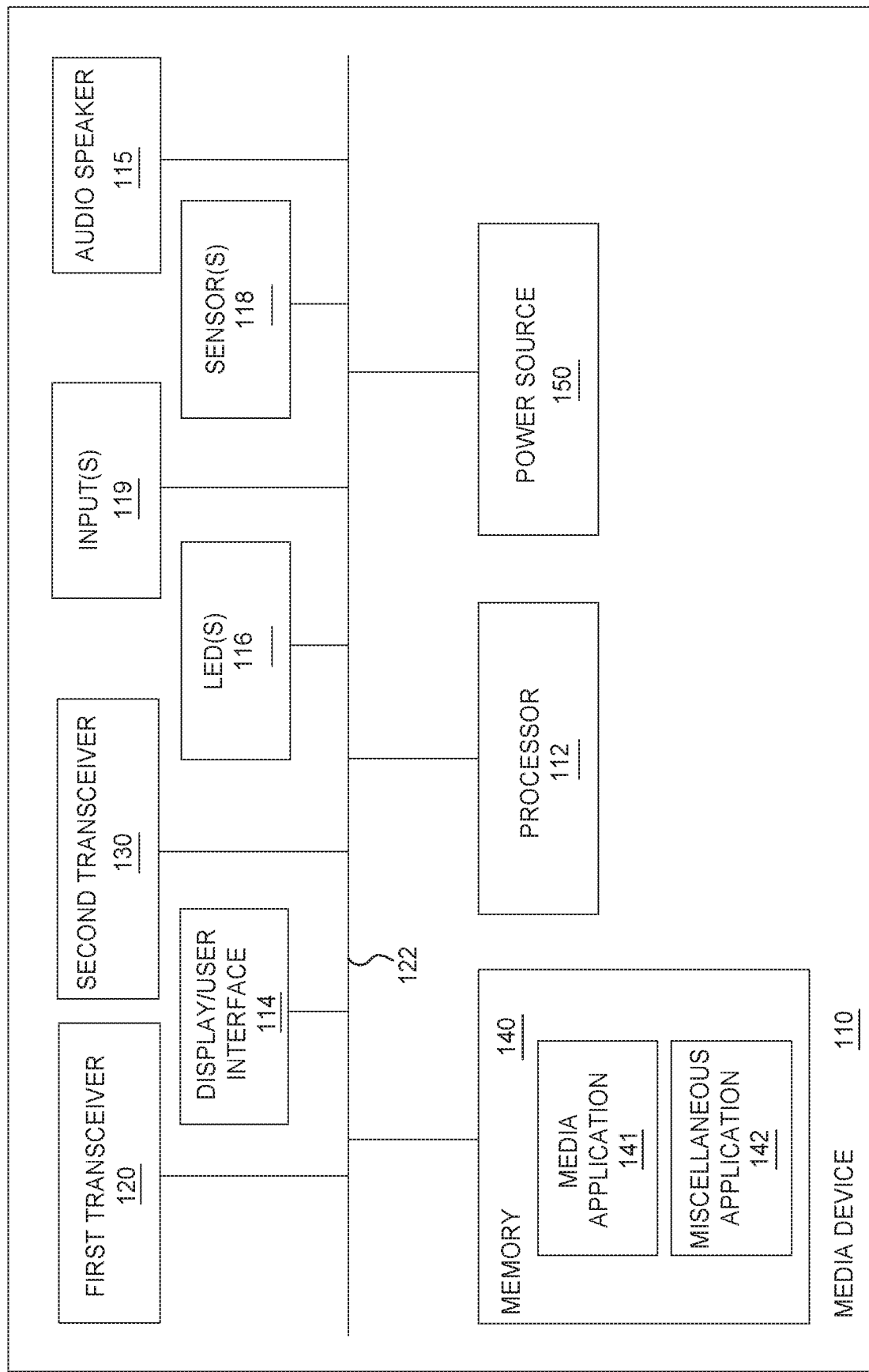
FIG. 1B illustrates an exemplary media device from the group that may be used in the embodiments and methods described herein, according to one embodiment.

FIG. 1B schematically illustrates the functional elements of an exemplary media device 110 from the group G that may be used in the embodiments and methods described herein, according to one embodiment. As shown, the media device 110 includes a first transceiver 120, a second transceiver 130, a memory 140, a power source 150, a processor 112, an audio speaker 115, and an interconnect 122 for providing power and communication between the components of the media device 110. In some embodiments, the media device 110 can further include, without limitation, a display/user interface 114, one or more LEDs 116, and one or more sensors 118 (e.g., a sensor for determining how fully charged a battery for the device is), and one or more inputs 119 (e.g., a button, touch screen, etc.). Of course, an actual media device, such as wireless speaker, will include a variety of additional hardware components that are not shown. Furthermore, an actual media device, such as a wireless speaker, may not include all of the components shown in FIG. 1B, such as the display/user interface 114 or the one or more LEDs 116.

The first transceiver 120 can be used to communicate on the wireless network 110N for the communication between the media devices 110 as described above. For example, the first transceiver 120 can be a Wi-Fi transceiver for communicating on the wireless network 110N, which can be a Wi-Fi network. The second transceiver 130 can be used to communicate to one or more devices outside of the group G of media devices 110, such as for communication with a content source device, such as the first content source device 51 shown in FIG. 1A. Using the two separate transceivers enables the communication between the media devices 110 to be independent from the other wireless communication, such as communication with the content source device and other communications near the media devices 110, which provides numerous benefits as described above. The media device 110 may use both transceivers 120, 130 when the media device 110 is serving as the source media device for the group G, such as how the first media device $110_1$ is serving as the source media device in FIG. 1A. When the media device 110 is not serving as the source media device, the media device 110 may only use the first transceiver 120 in order to conserve power. Some media devices 110 may only include one transceiver, and in such embodiments these media devices only communicated on the wireless network 110N and do not communicate outside the group G, for example by communicating with the first content source device 51.

The memory 140 may be any technically feasible type of hardware unit configured to store data, such as a non-transitory memory. For example, memory 140 could be a hard disk, a random access memory (RAM) module, a flash memory unit, or a combination of different hardware units configured to store data. The memory 140 can include a media application 141. The media application 141 stored within the memory 140, can include program code that may be executed by processor 112 in order to perform all of the various functions associated with the media device 110 described herein. These functions can include, but are not limited to, functions associated with communication with one or more other media devices 110 in the group G (e.g., communication of the media content in the group G), outputting of the media content, and communication with devices outside the group G, such as communication with a content source device (e.g., the first content source device 51 shown in FIG. 1A). These functions can also include execution of the methods described in reference to the process flow diagrams shown in FIGS. 2B and 4C as well as execution of the functions related to how the group G transitions from different arrangements, such as from the first configuration $110C_1$ shown in FIG. 1A to the second configuration $110C_2$ shown in FIG. 2A. The memory 140 can also be used to store data related to execution of these functions. For example, the memory 140 can be used to store settings that control how some of the functions are executed, such as RSSI thresholds, error rate thresholds, and response time thresholds, which are described in further detail below. The memory 140 may also include the one or more miscellaneous applications 142, such as applications for interacting with the other components on the media device 110, such as the display/user interface 114 and the audio speaker 115. The media device 110 utilizes the processor 112 and one or more software applications 142 (i.e., software algorithm(s)) stored in memory 140, which includes a number of instructions which, when executed by the processor 112, causes the media device 110 to perform one or more of the methods and operations described herein.

The processor 112 is generally configured to retrieve and execute applications, such as the media application 141. The processor 112 can include a clock that may be used for any timers that may be used by the media application 141 or other applications, for example timers that enable the group G of media devices 110 to output the media content in a synchronized manner. In some embodiments, the clocks in each of the media devices 110 in the group G can be synchronized and the media devices 110 in the group G can each be instructed to output the media content at a specific time on the synchronized clocks instead of being based on the delay periods described above.

The power source 150 can provide power to all of the components of the media device 110. In some embodiments, the power source 150 can include components that enable the media device 110 to be portable, such as a rechargeable battery, as well as components for when the media device 110 is stationary, such as components to recharge a rechargeable battery. In some embodiments, a media device 110 that is receiving external power (e.g., a media device 110 that is plugged into an electrical outlet) can be given preferential status for being chosen as the source media device or access point media device for the group G of media devices 110 since the media devices 110 acting as the source media device or access point media device can often consume more power than the media devices that are not transmitting media content, such as the media devices $110_{3\text{-}5}$ shown in FIG. 1A. In some embodiments, the first media device 110 to power on in an area can be designated as the access point media device based on a lack of detection of another access point media device. For example, when a media device 110 powers on, the media application 141 can be executed to check if an existing access point media device is within communication range. Continuing the example, if there is no other access point media device within communication range, then the recently powered on media device can designate itself to be the access point media device for a group that can eventually form when more media devices 110 power on or come within a communication range. After designating itself (i.e., the recently powered on media device) as the access point media device, then the access point media device can begin broadcasting a notification signal to the other media devices that the broadcasting media device is the access point media device when those other media devices eventually power on or come within communication range of the broadcasting media device. In some embodiments, the broadcast can initiate a duplex communication that allows the other media devices to establish communication with the access point media device and acknowledge the broadcasting media device as the access point media device after the other media devices have received the notification signal. In other embodiments, the broadcast may only include a simplex communication that allows the access point media device to announce that it is taking the role of the access point media device by transmitting the notification signal. If two media devices 110 designated as access point media devices 110 come within communication range of each other, then the media device 110 determined to be better suited to be the access point media device can be chosen to be the access point media device for the group as described below in reference to FIGS. 4A-4C.

Figure 2A:
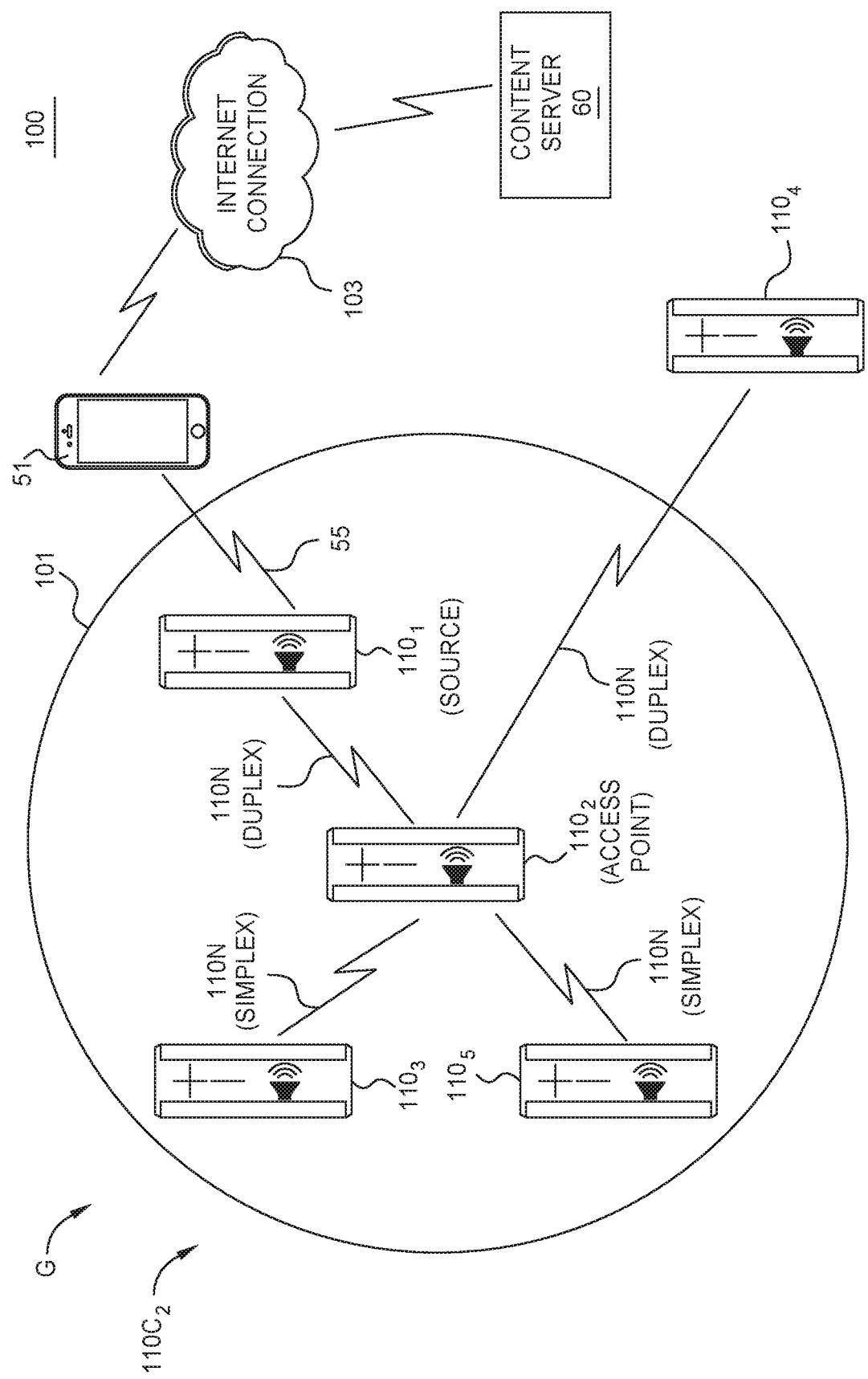
FIG. 2A is a block diagram of the content distribution system showing the group of media devices in a second configuration, according to one embodiment.

FIG. 2A is a block diagram of the content distribution system 100 showing the group G of media devices 110 in a second configuration $110C_2$, according to one embodiment. The second configuration $110C_2$ is the same as the first configuration $110C_1$ described above in reference to FIG. 1A except that the mode of communication (e.g., simplex communication or duplex communication) for some of the media devices 110 is changed in the second configuration $110C_2$ (FIG. 2A) relative to the first configuration $110C_1$ (FIG. 1A). For example, communication between the access point media device $110_2$ and the fourth media device $110_4$ has switched to duplex communication in the second configuration $110C_2$ (FIG. 2A) from simplex communication in the first configuration $110C_1$ (FIG. 1A). Similarly, communication between the access point media device $110_2$ and the fifth media device $110_5$ has switched to simplex communication in the second configuration $110C_2$ (FIG. 2A) from duplex communication in the first configuration $110C_1$ (FIG. 1A).

Figure 2B:
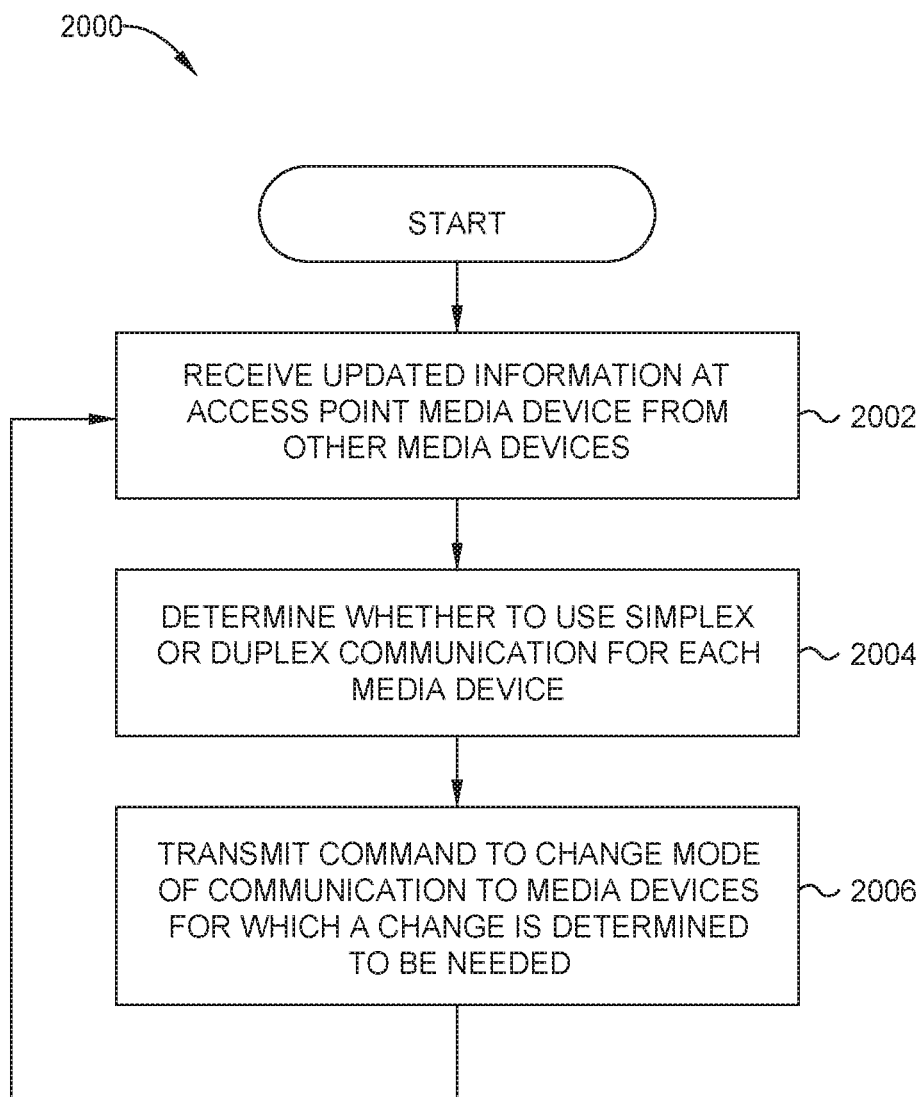
FIG. 2B is a process flow diagram of a method for changing the mode of communication (e.g., simplex communication to duplex communication) between the access point media device and one or more of the other media devices, according to one embodiment.

FIG. 2B is a process flow diagram of a method 2000 for changing the mode of communication (e.g., simplex communication to duplex communication) between the access point media device $110_2$ and one or more of the other media devices 110, according to one embodiment. The method 2000 is described in reference to how the communication mode can be changed for the fourth media device $110_4$ and the fifth media device $110_5$ as the group G of media devices 110 transitions from the first configuration $110C_1$ (FIG. 1A) to the second configuration $110C_2$ (FIG. 2A). This transition can happen, for example, when the fourth media device $110_4$ moves further from the access point media device $110_2$, and the fifth media device $110_5$ moves closer to the access point media device $110_2$.

The method 2000 can be performed by the access point media device $110_2$ for each media device 110 in the group G. However, in some embodiments, the source media device $110_1$ can be excluded since it may be desirable to have the source media device $110_1$ always communicate with the access point media device $110_2$ using duplex communication since the communication to the rest of the group G depends on the communication between the source media device $110_1$ and the access point media device $110_2$.

The method 2000 begins at block 2002 with the access point media device $110_2$ receiving updated information from the media devices $110_{3\text{-}5}$. This updated information can include information (e.g., RSSI levels, response times, and/or error rates) related to determining confidence level indicators for communication between the access point media device $110_2$ and the corresponding other media devices $110_{3\text{-}5}$.

At block 2004, the access point media device $110_2$ uses the received information from block 2002 to determine, for each media device $110_{3\text{-}5}$, whether that particular media device 110 should communicate with the access point media device $110_2$ using simplex communication or duplex communication for the media content. For example, the access point media device $110_2$ can use the received information to determine the confidence level indicator for communicating with each media device $110_{3\text{-}5}$. As described above, this confidence level indicator can be determined from RSSI levels, response times, and/or error rates related for communicating with each media device $110_{3\text{-}5}$ in which higher RSSI levels, faster response times, and lower error rates indicate higher confidence while lower RSSI levels, slower response times, and higher error rates indicate lower confidence. Simplex communication can be used when high confidence is indicated by the confidence level indicator while duplex communication can be used when low confidence is indicated by the confidence level indicator.

Referring to the transition from the first configuration $110C_1$ (FIG. 1A) to the second configuration $110C_2$ (FIG. 2A), the access point media device $110_2$ can use the received information to determine that the access point media device $110_2$ should (1) continue to communicate with the third media device $110_3$ using simplex communication based on the confidence level indicator continuing to indicate high confidence for communication with third media device $110_3$, (2) switch communication with the fourth media device $110_4$ from simplex communication to duplex communication based on the confidence level indicator changing from high confidence to low confidence for the fourth media device $110_4$, and (3) switch communication with the fifth media device $110_5$ from duplex communication to simplex communication based on the confidence level indicator changing from low confidence to high confidence for the fifth media device $110_5$.

Although the description above for block 2004 describes switching the mode of communication between the access point media device $110_2$ and other media devices 110 based on a confidence level indicators for communication between the access point media device $110_2$ and another individual media device 110, in some embodiments the mode of communication can be switched based on one or more group indicators that indicate features or conditions effecting the entire group G of media devices 110. The number of media devices 110 connected to the access point media device $110_2$ can be a group indicator. For example, in one embodiment the access point media device $110_2$ can switch the mode of communication for all of the media devices 110 (other than the source media device $110_1$) to simplex communication based on the number of media devices 110 connected to the access point media device $110_2$ being above a threshold. For example, in one such embodiment, the access point media device $110_2$ can switch the mode of communication for the connected media devices 110 when the number of connected media devices 110 (other than the source media device $110_1$) is greater than five. Similarly, the mode of communication can be switched to duplex for all of the media devices 110 when the number of connected media devices 110 (other than the source media device $110_1$) is five or less.

Other group indicators can be related to conditions effecting the network 110G, such as available bandwidth or levels of interference from other wireless devices. For example, in another embodiment, the access point media device $110_2$ can switch the mode of communication for all of the media devices 110 (other than the source media device $110_1$) to simplex or duplex communication based on how much time the access point media device has to transmit a media packet, which can be based on bandwidth available to the access point media device $110_2$ for transmitting media content to the other media devices 110 and/or interference from other electronic devices communicating on a same or similar frequency. For example, when the bandwidth is limited or the level of interference is high, the access point media device $110_2$ may have to wait to the transmit media content to the media devices 110 in the group G to avoid collisions with other devices, such as devices outside of the group G.

In still other embodiments, the access point media device $110_2$ can switch the mode of communication for an individual media device 110 based on a combination of (1) data for the individual media device 110 (e.g., RSSI level and/or error rates for that individual media device 100) with (2) other data available to the access point media device $110_2$, such as the number of devices in the group G or determining there is limited bandwidth or high levels of interference from other electronic devices communicating on a same or similar frequency.

In still other embodiments, the access point media device $110_2$ can switch the mode of communication for all media devices 110 based on a combination of group indicators. For example, while the access point media device $110_2$ may generally switch the mode of communication to simplex or duplex communication based on the number of connected media devices being greater than five, if there is a medium level of interference (i.e., a level of interference lower than the level at which the access point media device $110_2$ would switch the mode of communication based solely on the level of interference), then the access point media device $110_2$ may switch the mode of communication at a lower threshold number devices, such as three media devices 110.

At block 2006, the access point media device $110_2$ transmits a command to change the mode of communication (i.e., from simplex communication to duplex communication or vice versa) to each media device 110 for which the access point media device $110_2$ determined there should be a change in the mode of communication for the media content. For example, referring to the transition from the first configuration $110C_1$ (FIG. 1) to the second configuration $110C_2$ (FIG. 2A), the access point media device $110_2$ can (1) transmit a command to the fourth media device $110_4$ to change the communication mode to duplex communication from simplex communication, and (2) transmit a command to the fifth media device $110_5$ to change the communication mode to simplex communication from duplex communication. After block 2006, the method 2000 can repeat periodically, such as once every millisecond, once per second, once per minute, etc. In some embodiments, for example embodiments using Wi-Fi, the media devices 110 receiving media content from the access point media device $110_2$ can switch between simplex and duplex without receiving a separate command.

Figure 3:
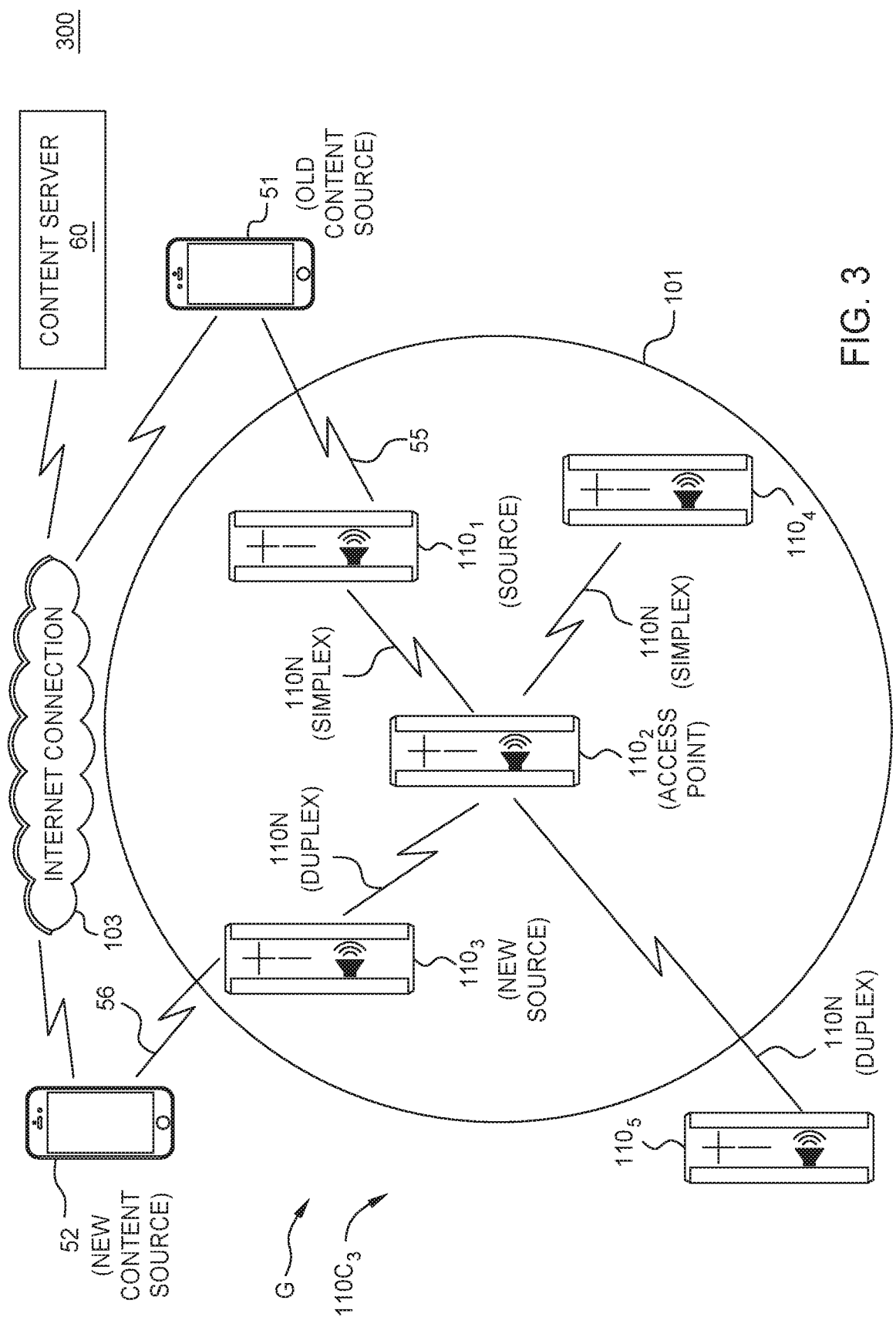
FIG. 3 is a block diagram of a content distribution system, according to one embodiment.

FIG. 3 is a block diagram of a content distribution system 300, according to one embodiment. The content distribution system 300 is the same as the content distribution system 100 described above in reference to FIG. 1A except that the content distribution system 300 includes a second content source device 52 in addition to the first content source device 51, and the group G of media devices 110 are shown in a third configuration $110C_3$. In the content distribution system 300, the content source device is switched from the first content source device 51 to the second content source device 52. Furthermore, the source media device 110 is switched from the first media device $110_1$ in the first configuration $110C_1$ in FIG. 1A to the third media device $110_3$ in the third configuration $110C_3$ in FIG. 3.

The second content source device 52 is connected to the third media device $110_3$ over a second communication link 56. The second communication link 56 can be a wireless communication link, for example a Bluetooth® or Wi-Fi communication link. The second content source device 52 can be connected to the content server 60 through the internet connection 103, so that media content from the content server 60 can be provided to the group G of media devices $110_1$-$110_5$ through the second content source device 52. The second content source device 52 is shown as a smart phone, but the content source device can be any type of electronic device capable of transmitting media content to at least one of the media devices media devices $110_1$-$110_5$. The content distribution system 300 shows the content source devices 51, 52 connected to a same content server 60 of a single content provider (e.g., Spotify®), but the second content source device 52 could just as easily be connected to a content server (not shown) of a different content provider (e.g., Apple Music, Netflix) relative to the first content source device 51 without departing from the benefits described below. Furthermore, each content source device 51, 52 can also be connected to more than one content provider, so that media content can be provided to the group G of media devices 110 from different content providers through the same content source device.

The second media device $110_2$ remains the access point for the group G in the content distribution system 300. As described above, communication of the media content between the source media device and the access point media device $110_2$ is generally performed using duplex communication. Therefore, communication of the media content between the third media device $110_3$ and the second media device $110_2$ is switched from simplex communication in the content distribution system 100 (FIG. 1A) to duplex communication in the content distribution system 300 (FIG. 3). Similarly, communication of the media content between the second media device $110_2$ and the first media device $110_1$ is switched from duplex communication in the content distribution system 100 to simplex communication in the content distribution system 300 because the first media device $110_1$ is no longer the source media device and because the first media device $110_1$ is located within the high-confidence zone 101.

The source media device for the group G can change for a variety of reasons. As one example, the source media device can be changed based on permission from the existing content source device (i.e., the first content source device 51) when a request is made by a new content source device (i.e., the second content source device 52). In some embodiments, the request can be transmitted from the new content source device to the existing content source device through the group G. For example, in FIG. 3 the request can be sent from the second content source device 52 to the third media device $110_3$, from the third media device $110_3$ to the access point media device $110_2$, from the access point media device $110_2$ to the first media device $110_1$, and from the first media device $110_1$ to the first content source device 51. Upon receiving the request, a prompt or other indication of the request can appear, for example, on the screen of the first content source device 51 to grant the request to change the content source device for the group G to the second content source device 52. Often, each content source device is only connected to one media device 110, so changing the content source device is often accompanied by a corresponding change in the source media device 110. For example, the second content source device 52 is only directly connected to the third media device $110_3$, so changing the content source device to the second content source device 52 is accompanied with changing the source media device from the first media device $110_1$ to the third media device $110_3$.

In other embodiments, the content source device and source media device can change automatically based on a change in circumstances. Some examples of these changes in circumstances can include (1) unavailability of the existing content source device or existing source media device, (2) a weak signal between the existing content source device and the existing source media device or between the existing source media device and the access point media device, or (3) reaching an end of content on the existing content source device (e.g., end of a playlist).

Figure 4A:
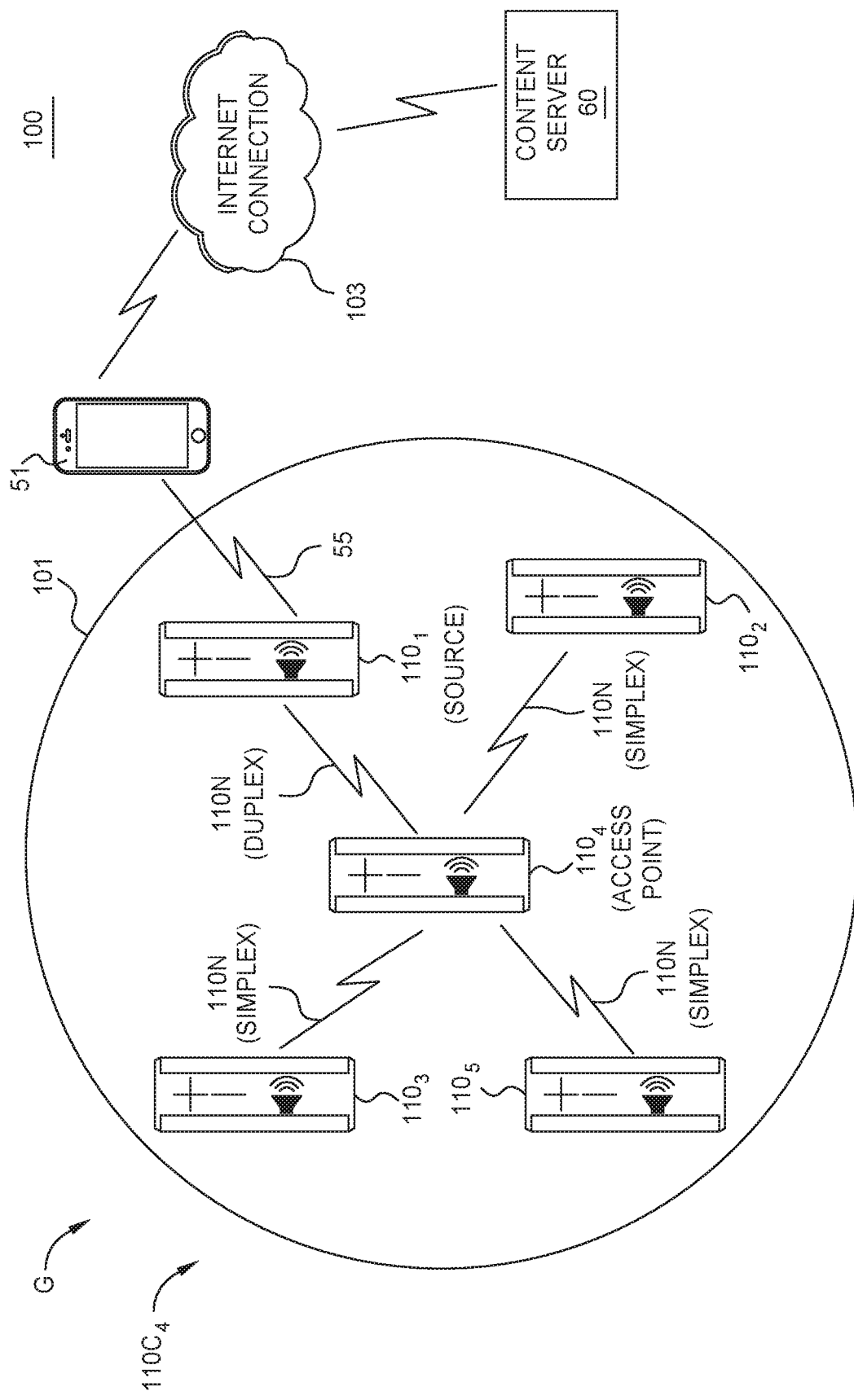
FIG. 4A is a block diagram of the content distribution system showing the group G of media devices in a fourth configuration, according to one embodiment.

FIG. 4A is a block diagram of the content distribution system 100 showing the group G of media devices 110 in a fourth configuration $110C_4$, according to one embodiment. The fourth configuration $110C_4$ is the same as the first configuration $110C_1$ described above in reference to FIG. 1A except that the access point media device 110 has switched from the second media device $110_2$ in the first configuration $110C_1$ (FIG. 1A) to the fourth media device $110_4$ in the fourth configuration $110C_4$ (FIG. 4A), and there is one less instance of duplex communication in the fourth configuration $110C_4$ compared to the first configuration $110C_1$. In the fourth configuration $110C_4$, the only duplex communication in the group G is between the source media device $110_1$ and the access point media device $110_4$.

The media device 110 acting as the access point media device for the group G can switch when it is determined that a different media device 110 is better suited to be the access point media device than the existing access point media device 110. Referring to the FIG. 1A before the configuration transitions from the first configuration $110C_1$ to the fourth configuration $110C_4$, the determination that a different media device is better suited to be the access point media device can be made by the existing access point media device $110_2$, the source media device $110_1$, or the media device $110_4$ that is to become the new access point media device of the group G.

The following describes some exemplary reasons why the fourth media device $110_4$ can be determined to be better suited than the existing access point media device $110_2$ to be the access point media device for the group G, but these reasons similarly apply to the other media devices 110 in the group G. In one embodiment, the fourth media device $110_4$ can be determined to be better suited to be the access point media device for the group G than the existing access point media device $110_2$ based on determining the fourth media device $110_4$ can make a better connection to the source media device $110_1$ than the connection between the existing access point media device $110_2$ and the source media device $110_1$. For example, the fourth media device $110_4$ can determine a higher confidence level for a connection between the fourth media device $110_4$ and the source media device $110_1$ based on one or more confidence level indicators than a corresponding confidence level for the connection between the existing access point media device $110_2$ and the source media device $110_1$. These confidence level indicators can be determined from RSSI levels, response times, and/or error rates as described above for connections between the source media device $110_1$ and the corresponding media devices $110_2$, $110_4$. The media devices 110 in the group G can periodically check RSSI levels, response times, and/or error rates for their direct connection to source media device $110_1$, so that the media device 110 acting as the access point media device for the group G can be switched to the media device with the best confidence level indicator (i.e., highest RSSI level, fastest response time, or lowest error rate) for a connection to the source media device $110_1$.

In another embodiment, the fourth media device $110_4$ can be determined to be better suited to be the access point media device for the group G than the existing access point media device $110_2$ based on determining the fourth media device $110_4$ can form a better overall connection to the other media devices 110 in the group. For example, in one such embodiment, the fourth media device $110_4$ can determine confidence level indicators for a direct connection to each media device 110 in the group G based on RSSI levels, response times, and/or error rates as described above. These confidence level indicators can be compared to corresponding confidence level indicators determined by the existing access point media device to determine which media device 110 has a better overall connection to the other media devices 110 in the group G. In one embodiment, a sum of confidence level indicators can be used to determine which media device 110 has a better overall connection to the other media devices 110 in the group G. For example, the media device 110 with the highest sum of RSSI levels, lowest sum of response times, or lowest sum or error rates can be chosen to be the access point media device for the group G.

In another embodiment, a particular media device 110 can be determine to be better suited to be the access point media device than the other media devices 110 based on having better hardware (e.g., a faster CPU, more memory, faster transmitter/receiver, and/or more accurate clock) than the other media devices. In another embodiment, a particular media device 110 can be determine to be better suited to be the access point media device than the other media devices 110 based on the particular media device 110 already being designated as the source media device, and in such embodiments this one media device 110 can serve as both the source media device and as the access point media device. In another embodiment, if two media devices 110 have client connections to other media devices 110, then the media device with more client connections can be determined to be better suited to be the access point media device 110. In some embodiments, a new media device 110 that joins the group G can be determined to be better suited to be the access point media device 110. For example, when a new media device 110 joins the group G, and the new media device 110 is located roughly at the center between two other media devices 110 that are spaced far apart from each other, then the new media device 110 may be determined to be better suited than the other media devices 110 to be the access point media device for the group G.

Switching which media device 110 is acting as the access point media device can result in a lower usage of duplex connections (i.e., the connections generally used for lower RSSI levels, slower response times, and/or higher error rate). For example, the first configuration $110C_1$ (FIG. 1A)—with the second media device $110_2$ acting as the access point media device—includes two instances of duplex communication in the group G while the fourth configuration $110C_4$ (FIG. 4A)—with the fourth media device $110_4$ acting as the access point media device—has only one instance of duplex communication. Thus, determining that a lower number of duplex communication connections can be used can also be a reason for switching the access point media device for the group G since this can reduce traffic on the network 110N.

Figure 4B:
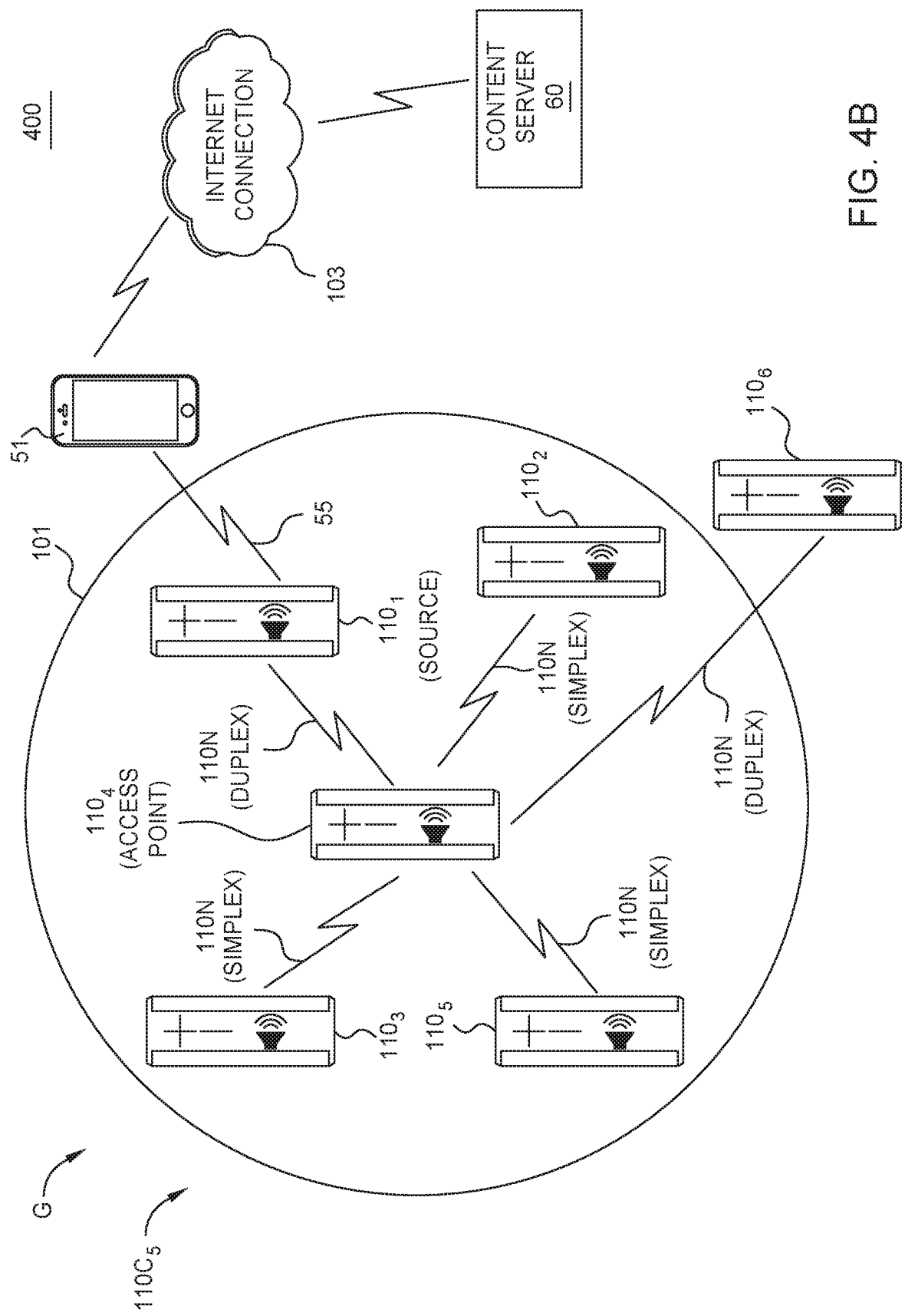
FIG. 4B is a block diagram of a content distribution system, according to one embodiment.

FIG. 4B is a block diagram of a content distribution system 400, according to one embodiment. The content distribution system 400 is the same as the content distribution system 100 described above in reference to FIG. 1A except for the following differences. First, the content distribution system 400 includes a group G of six media devices $110_{1-6}$ in a fifth configuration $110C_5$ compared to the group G of five media devices $110_{1-5}$ in the first configuration $110C_1$. Additionally, the access point media device has been switched from the second media device $110_2$ in the first configuration $110C_1$ (FIG. 1A) to the fourth media device $110_4$ in the fifth configuration $110C_5$ (FIG. 4B).

Figure 4C:
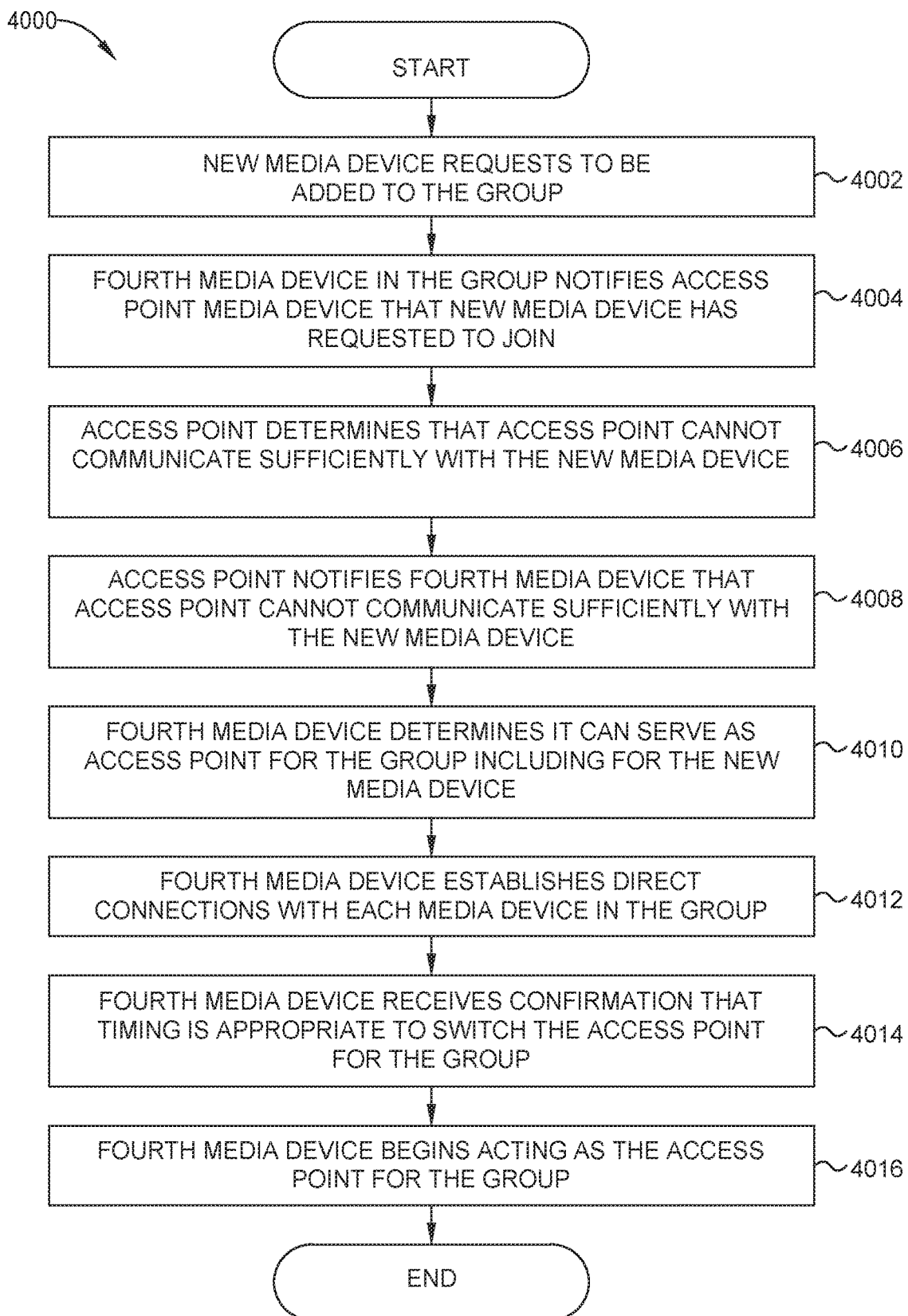
FIG. 4C is a process flow diagram of a method for switching the access point media device for the group in order to add the sixth media device to the group, according to one embodiment.

The following description provides an example of how adding the sixth media device $110_6$ to the group G can cause the group G to transition from the first configuration $110C_1$ in FIG. 1A to the fifth configuration $110C_5$ in FIG. 4B. FIG. 4C is a process flow diagram of a method 4000 for switching the access point media device for the group G in order to add the sixth media device $110_6$ to the group G, according to one embodiment.

The method 4000 begins at block 4002. Immediately preceding block 4002, the group G of media devices 110 are in the first configuration $110C_1$ as shown in FIG. 1A. At block 4002, the sixth media device $110_6$ requests to be added to the group G. The request is received at one or more of the media devices 110 other than the existing access point media device $110_2$. For example, the request can be received by the fourth media device $110_4$.

At block 4004, the fourth media device $110_4$ notifies the access point media device $110_2$ that the sixth media device $110_6$ has requested to join the group G.

At block 4006, the access point media device $110_2$ determines that the access point media device $110_2$ cannot communicate directly or cannot establish a sufficient direct connection (e.g., a connection with sufficient confidence level indicators based on RSSI levels, response times and/or error rates) with the sixth media device $110_6$.

At block 4008, the access point media device $110_2$ notifies the fourth media device $110_4$ that the access point media device $110_2$ cannot communicate with the sixth media device $110_6$ with sufficient confidence (e.g., a desired level of confidence) using a direct connection between the access point media device $110_2$ and the sixth media device $110_6$.

At block 4010, the fourth media device $110_4$ determines that the fourth media device $110_4$ can directly communicate with sufficient confidence (e.g., a desired level of confidence) with each existing media device 110 as well as with the new sixth media device $110_6$, and is thus better suited than the second media device $110_2$ to serve as the access point media device for the group G. This sufficient confidence can be established, for example, by receiving responses from each of the other five media devices 110 with (1) RSSI levels above a designated threshold (2) response times below a designated threshold, or (3) error rates below a designated threshold.

At block 4012, the fourth media device $110_4$ establishes direct connections with each other media device 110 in the group G, so that the fourth media device $110_4$ can begin to serve as the access point media device for the group G of media devices $110_{1-6}$.

At block 4014, the fourth media device $110_4$ receives confirmation that the timing is appropriate to switch the access point media device for the group G. This confirmation can be received from the existing access point media device $110_2$ or from the source media device $110_1$. In some embodiments, where a minor interruption of the media content is not a problem, the fourth media device $110_4$ can receive immediate confirmation from the existing access point media device $110_2$ or from the source media device $110_1$.

On the other hand, where an interruption in the streaming of the media content is undesirable (e.g., the time to switch devices is inappropriate), it can be beneficial to wait for an upcoming period of silence or less important content, so that the switch of the access point media device is either undetectable or less detectable by the users of the media devices 110. For example, for audio track-based content, such as a playlist, it can be appropriate to wait for the end of a song or the end of the playlist in order to switch the access point media device. For other forms of audio content, such as a podcast or talk show, it may be appropriate to wait for a period of silence or less important content (e.g., a lack of detectable speech during a talk show). In some embodiments, the source media device $110_1$ or the first content source device 51 can analyze the media content to determine when a period of silence or less important content is detected. As discussed above, the source media device $110_1$ can output the media content, for example from its own speaker, after a lag period (e.g., 1 second), so that the entire group G can output the media content in a synchronized manner. This lag period can assist the source media device $110_1$ in determining when there is an upcoming period of silence or low level of important content, so that a smoother switch of the access point media device can be made. This lag period can be increased if smoother transitions for changes of the access point media device are desired. Once, the appropriate time period is identified, the source media device $110_1$ can transmit the confirmation to the new access point media device $110_4$ either directly or through the existing access point media device $110_2$ that the timing is appropriate to perform the switching of the access point media device. Waiting for the appropriate time to switch the access point media device can also be applicable to other instances of switching of the access point media device, such as the reasons discussed in relation to FIG. 4A. The content within the media content can thus be used to determine the timing of when to switch the access point media devices.

At block 4016, after it is determined that the timing is appropriate to switch the access point media device at block 4014, the fourth media device $110_4$ begins to serve as the access point media device for the group G of media devices $110_{1-6}$, which completes the transition of the group G of media devices from the first configuration $110C_1$ (FIG. 1A) to the fifth configuration $110C_5$ (FIG. 4B).

In some embodiments of the disclosure, a wireless communication system includes a group of media devices that include a plurality of media devices, such as a first media device, a second media device, a third media device, and a fourth media device. Each of the media devices include a processor and one or more software applications that are stored in memory. The one or more software applications within the first media device include a number of instructions which, when executed by the processor, causes the first media device to act as an access point media device for the group, and transmit media content to each of the other media devices in the group, during a first time period. The one or more software applications within the second media device include a number of instructions which, when executed by the processor, causes the second media device to become the access point media device during, and transmit media content to each of the other media devices in the group, during a second time period, based on a determination that the second media device is better suited than the first media device to be the access point media device for the group during the second time period.

While the foregoing is directed to embodiments of the present disclosure, other and further embodiments of the disclosure may be devised without departing from the basic scope thereof, and the scope thereof is determined by the claims that follow.

What is claimed is:

1. A wireless communication system, comprising:
a group of media devices comprising a first media device, a second media device, a third media device, and a fourth media device, wherein
the first media device, during a first time period, is configured to act as an access point media device for the group and transmit media content to each of the other media devices in the group,
the second media device is configured to become the access point media device during a second time period and transmit media content to each of the other media devices in the group based on a determination that the second media device is better suited than the first media device to be the access point media device for the group during the second time period,
the second media device is determined to be better suited than the first media device based on determining that the second media device is capable of forming better overall connections to the other media devices in the group than the corresponding connections that the first media device can form,
the access point media device is configured to transmit media content to the other media devices in the group using either simplex communication or duplex communication, and
the second media device is determined to be capable of forming better overall connections to the other media devices in the group during the second time period based on determining that the second media device can successfully transmit the media content to the other media devices in the group using less duplex communication connections than the first media device.

2. The wireless communication system of claim 1, wherein determining the second media device is capable of forming better overall connections to the other media devices in the group is further based on determining that the other media devices can respond faster to communications from the second media device than to communications from the first media device.

3. The wireless communication system of claim 1, wherein determining the second media device is capable of forming better overall connections to the other media devices in the group is further based on determining that the other media devices can respond with lower error rates to communications from the second media device than to corresponding communications from the first media device.

4. The wireless communication system of claim 1, wherein the second media device is configured to become the access point media device for the group during the second time period when a confirmation is received at the second media device indicating that the timing is appropriate to switch the access point media device based on content of the media content.

5. The wireless communication system of claim 1, wherein
determining the second media device is better suited than the first media device during the second time period is further based on determining that the second media device is capable of forming a connection with each media device in the group and a connection with a new media device that is requesting to join the group, and
the first media device is unable to form a connection with the new media device during the second time period.

6. The wireless communication system of claim 1, wherein
determining the second media device is better suited than the first media device during the second time period is further based on determining that the second media device is capable of forming a connection with a desired level of confidence with each media device in the group and a connection with a desired level of confidence with a new media device that is requesting to join the group, and
the first media device is unable to communicate with the new media device with a desired level of confidence during the second time period.

7. The wireless communication system of claim 6, wherein
the second media device is determined to be capable of forming the connection with a desired level of confidence with each media device in the group and the connection with a desired level of confidence with the new media device based on one or more RSSI levels from each media device in the group and one or more RSSI levels from the new media device being greater than a designated threshold.

8. The wireless communication system of claim 6, wherein
the second media device is determined to be capable of forming the connection with a desired level of confidence with each media device in the group and the connection with a desired level of confidence with the new media device based on an error rate for each media device in the group and an error rate for the new media device being less than a designated threshold, and the error rates relate to a number of errors indicated in one or more responses from each media device in the group and the new media device to one or more communications to the corresponding media device from the second media device.

9. A wireless communication system, comprising:
a group of media devices comprising a first media device, a second media device, a third media device, and a fourth media device, each media device configured to output media content, wherein
the first media device is designated as a source media device,
the second media device, during a first time period, is designated as an access point media device that is configured to transmit media content received from the source media device to each of the media devices in the group other than the source media device,
the third media device is configured to be the access point media device during a second time period and transmit media content received from the source media device to each of the media devices in the group other than the source media device based on (1) a determination that the third media device is better suited than the second media device to be the access point media device for the group during the second time period and (2) receiving confirmation from the source media device that the timing is appropriate to switch the access point media device based on identification of content within the media content by the source media device, and
the media devices in the group are each configured to output the media content received and transmitted by the access point media device in a synchronized manner during the first time period and the second time period.

10. The wireless communication system of claim 9, wherein the content within the media content comprises a period of silence in the media content.

11. The wireless communication system of claim 9, wherein the content within the media content comprises a lack of detectable speech in the media content.

12. A method of distributing media content throughout a group of media devices comprising a first media device, a second media device, a third media device, and a fourth media device, each media device configured to output media content, the method comprising:
designating the first media device, during a first time period, as an access point media device for the group;
transmitting, by the first media device, media content to the other media devices in the group during the first time period;
switching, during a second time period, the media device acting as the access point media device for the group from the first media device to the second media device based on a determination that the second media device is better suited than the first media device to be the access point media device for the group during the second time period, wherein
the second media device is determined to be better suited than the first media device based on determining that the second media device is capable of forming better overall connections to the other media devices in the group than the corresponding connections that the first media device can form,
the access point media device is configured to transmit media content to the other media devices in the group using either simplex communication or duplex communication, and
the second media device is determined to be capable of forming better overall connections to the other media devices in the group during the second time period based on determining that the second media device can successfully transmit the media content to the other media devices in the group using less duplex communication connections than the first media device; and
transmitting, by the first media device, media content to the other media devices in the group during the first time period.

13. The method of claim 12, wherein determining the second media device is capable of forming better overall connections to the other media devices in the group is further based on determining that the other media devices can respond faster to communications from the second media device than to communications from the first media device.

14. The method of claim 12, wherein determining the second media device is capable of forming better overall connections to the other media devices in the group is further based on determining that the other media devices can respond with lower error rates to communications from the second media device than to corresponding communications from the first media device.

15. The method of claim 12, wherein the second media device is configured to switch to be the access point media device for the group during the second time period when a confirmation is received at the second media device indicating that the timing is appropriate to switch the access point media device based on identification of a period of silence or a period of less important content in the media content.

16. The method of claim 12, wherein
determining the second media device is better suited than the first media device during the second time period is further based on determining that the second media device is capable of forming a connection with each media device in the group and a connection with a new media device that is requesting to join the group, and
the first media device is unable to form a connection with the new media device during the second time period.

* * * * *